(12) United States Patent
Shih et al.

(10) Patent No.: US 7,316,512 B2
(45) Date of Patent: Jan. 8, 2008

(54) INTERCONNECT DEVICE

(75) Inventors: Min-Yi Shih, Niskayuna, NY (US);
Christopher James Kapusta,
Duanesburg, NY (US); William Paul Kornrumpf, Schenectady, NY (US);
Matthew Christian Nielsen, Scotia, NY (US); Samhita Dasgupta,
Niskayuna, NY (US); Eric Michael Breitung, Albany, NY (US)

(73) Assignee: General Electric Company,
Niskayuna, NY (US)

( * ) Notice: Subject to any disclaimer, the term of this patent is extended or adjusted under 35 U.S.C. 154(b) by 0 days.

(21) Appl. No.: 10/909,611

(22) Filed: Jul. 30, 2004

(65) Prior Publication Data

US 2006/0023990 A1    Feb. 2, 2006

(51) Int. Cl.
*G02B 6/36* (2006.01)
*G02B 6/30* (2006.01)
*G02B 6/26* (2006.01)
*G02B 6/34* (2006.01)
*G02B 6/42* (2006.01)

(52) U.S. Cl. .................... 385/93; 385/47; 385/49; 385/50; 385/88; 385/92

(58) Field of Classification Search .............. 385/47, 385/49, 50, 88, 92, 93
See application file for complete search history.

(56) References Cited

U.S. PATENT DOCUMENTS

| | | | |
|---|---|---|---|
| 4,379,613 A * | 4/1983 | Coburn | 136/247 |
| 4,835,704 A | 5/1989 | Eichelberger et al. | |
| 5,357,403 A | 10/1994 | Haller et al. | |
| 5,428,704 A * | 6/1995 | Lebby et al. | 385/92 |
| 5,449,427 A | 9/1995 | Wojnarowski et al. | |
| 5,525,190 A | 6/1996 | Wojnarowski et al. | |
| 5,577,142 A * | 11/1996 | Mueller-Fiedler et al. | 385/47 |
| 5,737,458 A | 4/1998 | Wojnarowski et al. | |
| 5,911,022 A * | 6/1999 | Plickert et al. | 385/49 |
| 6,453,091 B2 * | 9/2002 | Kawai | 385/33 |
| 6,641,310 B2 * | 11/2003 | Williams | 385/92 |
| 6,739,766 B2 * | 5/2004 | Xu et al. | 385/93 |
| 6,768,061 B2 * | 7/2004 | Kondo | 174/255 |
| 6,823,109 B2 * | 11/2004 | Sasaki et al. | 385/34 |
| 6,901,185 B2 * | 5/2005 | Sasaki et al. | 385/33 |
| 7,040,814 B2 * | 5/2006 | Morimoto et al. | 385/88 |
| 7,063,467 B2 * | 6/2006 | Nagasaka et al. | 385/88 |
| 2002/0096686 A1 * | 7/2002 | Raj et al. | 257/79 |
| 2002/0102060 A1 * | 8/2002 | Jewell et al. | 385/49 |
| 2004/0184737 A1 * | 9/2004 | Oono et al. | 385/52 |

(Continued)

OTHER PUBLICATIONS

Brown, Paul B. New Engineering Thermoplastic Options for Insulating Systems. GE Plastics. pp. 130-132, 1989.*

(Continued)

*Primary Examiner*—Michelle Connelly-Cushwa
*Assistant Examiner*—Rhonda S. Peace
(74) *Attorney, Agent, or Firm*—Fletcher Yoder (57) ABSTRACT

An apparatus is provided that includes a substrate having a top surface, at least one optical data transport medium coupled to the substrate, one or more lens devices coupled to the substrate, and one or more reflective devices coupled to the substrate. The one or more lens devices and the one or more reflective devices are at least partially passively aligned with the at least one optical transport medium by use of one or more pins.

46 Claims, 5 Drawing Sheets

U.S. PATENT DOCUMENTS

2005/0225864 A1* 10/2005 Kornrumpf et al. ........ 359/619
2006/0215963 A1* 9/2006 Hamano ...................... 385/49

OTHER PUBLICATIONS

Brown, Paul B. New Engineering Thermoplastic Options for Insulating Systems. GE Plastics. pp. 130-132 (Provided to the Applicant Jun. 9, 2005).*

K. Katsura, et al, Packaging for a 40-Channel Parallel Optical Interconnection Module With an Over 25-GB/S Throughput, 1998 Electronic Components and Technology Conference, 1998 IEEE, pp. 755-761.

BPA Consulting LTD, "Optical Backplane Technologies and Players", BPA Report No. 762, pp. 6-1-6-34, 7-1-7-13.

* cited by examiner

INTERCONNECT DEVICE

BACKGROUND

The continuing increase of data transfer rates between electronic devices such as communication devices has driven the need to increase the operating speeds for these devices. In order to achieve higher operating speeds, and subsequently increase bandwidth, communication devices may utilize components that operate at higher operating speeds. However, data transfer rates between such higher speed components, such as components of a computing system, have been the bottleneck of the overall system, such as a computing system with a central processing unit (CPU) capable of operating at 4.0 GHz, but only having the capability to transfer data between one or more components of the system at 800 MHz, for example. Uses of optical devices and/or signals to transfer electronic data between components of communication devices have provided improvements in overall system operating speeds. Optical signals may be utilized for performing electronic data transfer between components of a device by first receiving electrical signals from a first component of a device, converting the received electrical signals to optical signals, transmitting the optical signals over certain distances, converting the optical signals to electrical signals, and providing the electrical signals to a second component of a device, as just an example. In one type of electronic data transfer, a light source, such as a light emitting diode (LED) or a laser diode, for example, may produce the optical signals, and an interconnect device such, as a via, may at least partially provide optical signals from a source to a destination. Due at least in part to the operating speeds of optical devices, as well as the characteristics of optical signals, alignment of optical devices such as optical interfaces may be particularly important. Assembly of optical devices that complies with particular alignment criteria may be complex, expensive, and/or involve numerous process steps.

BRIEF DESCRIPTION

Briefly, in accordance with one embodiment of the present invention, an apparatus, comprises: a substrate, said substrate having a top surface; at least one optical data transport medium coupled to the substrate; one or more lens devices coupled to the substrate; and one or more reflective devices coupled to the substrate, wherein said one or more lens devices and one or more reflective devices are at least partially passively aligned with said at least one optical transport medium.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

DETAILED DESCRIPTION

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Use of optical data signals for sending and/or receiving electronic data have provided devices, such as communication devices, with the capability to operate at relatively high speeds, which may also be referred to as bandwidth. In this context, although the claimed subject matter is no so limited, communication devices may include, without limitation, desk top computers, laptop computers, hand held devices, cellular phones, switches, routers, hubs, repeaters, or the like. Devices such as these may be comprised of a plurality of components. These components may include, for example, active and/or passive components, such as one or more processing units or processors, one or more input/output devices, and/or one or more memories, such as static random access memory, dynamic random access memory, or flash memory, for example. One or more of these components may be coupled to one or more substrates, such as a circuit board, for example, and the one or more components may at least partially operate by exchanging data with one or more other components, for example. In operation, these one or more components may provide data in the form of electrical signals. The electrical signals, in at least one embodiment, when provided by a particular component, may be at least partially converted into optical signals, and the optical signals may be provided to one or more other components, and may be converted from optical signals to electrical signals as part of the data transfer process, resulting in improved data transfer as compared to a method of exchanging data wherein only electrical signals are utilized, due at least in part to the relatively high data transfer rates of optical signals as compared to electrical signals, for example. Data, when used in this context, may comprise data in analog and/or digital format, for example, but the claimed subject matter is not limited in this respect. In this context, optical, when used, such as in optical device, refers generally to a device capable of at least partially operating by use of electromagnetic radiation. However, it is important to note that optical devices in accordance with one or more embodiments are not limited to visible, near infrared, or infrared electromagnetic radiation. Similarly, optical, when used, such as with optical signals, refers generally to a signal comprising electromagnetic radiation, but again, is not limited to only visible electromagnetic radiation signals, for example.

In operation, one or more components of a communication device may exchange data with one or more other components, and this may be referred to as inter-component communication, for example. In at least one embodiment, in a communication device, wherein the device is comprised of a plurality of components, at least a portion of the components are coupled to one or more substrates, wherein at least one component at least partially utilizes electrical signals and at least one component at least partially utilizes optical signals, electrical signals may be converted to optical signals as part of the data transfer process. Conversion of electrical signals to optical signals, in at least one embodiment, may be performed by an interface device, which may comprise one or more light emitting and/or light detecting components, such as a light emitting diode (LED), a laser diode and/or a photodiode, for example, and the interface device utilizing one or more of the aforementioned components may be coupled to a substrate such as a circuit board, for example.

Types of light emitting and/or detecting devices may vary, but one particular device may comprise a vertical cavity surface emitting laser (VCSEL). A VCSEL device, which may include an array of VCSELs, in at least one embodiment, may comprise a device capable of being formed on a substrate, such as a circuit board, for example, and may be capable of sending and/or receiving data, such as data in the form of one or more electrical and/or optical signals, and in this manner may comprise an electrical/optical interface, for example. In operation, the VCSEL may receive one or more electrical signals, such as from a component of a circuit board, for example, and may convert one or more of the received electrical signals to one or more optical signals. The converted signals may be provided to one or more electrical and/or optical data transport media, such as one or more waveguides, including integrated waveguides, wherein the waveguides are integrated into one or more substrates, such as one or more circuit boards, for example. Fabrication of devices such as VCSEL devices and/or waveguides will be explained in more detail later. Additionally, the converted signals may be provided to one or more other transport media such as fiber optic cable, for example. As part of the data transfer process, the optical signals provided by a light emitting device, such as a VCSEL, may be received by one or more optical detectors such as a photo-diode, for example, which may be configured to detect and/or convert the optical signals to electrical signals, for example, and the electrical signals may be provided to one or more other components, such as a component on a circuit board, for example.

Typically, when utilizing an optical device, such as a VCSEL or a photo-detector, an interconnect device may be utilized to provide an interconnection to optical data transport media, such as a waveguide, for example. Types of interconnect devices may vary, and selection of a particular type of interconnect device may depend at least in part on the type of VCSEL and/or the type of photo-detector, and the type of communications media, for example, but it is desirable to note that an interconnect device may comprise any device capable of providing at least partially connectivity, such as optical and/or electrical connectivity, between two or more devices, for example. In at least one embodiment, an interconnect device may comprise an optical via, which may provide interconnection between a light emitting device, such as a VCSEL, or a light detecting device, such as a photo-detector, and another device, such as optical data transport media, including a waveguide, for example, and, typically, the optical via may be formed on a substrate, such as a circuit board or other type of substrate, for example. In one or more types of optical vias, the via may provide in plane (sometimes referred to as "co-planar") or out of plane coupling, meaning, respectively, in this context, that the optical beam provided by the VCSEL may be passed to an in-plane receiving device, such as optical data transport media, or may be deflected towards a receiving device, such as an out of plane receiving device, and may be reflected to an out of plane receiving device at an approximately particular angle, such as angle of approximately 90 degrees, for example, but, as will be explained in more detail later, the particular angle of reflection is not limited in this respect, but may be any angle that provides at least partially reflection of a beam from a light emitting device to a receiving device, for example.

Devices, such as interconnect devices, are typically formed based at least in part on particular criteria, such as alignment and/or tolerance criteria, and typically are formed by use of complicated and/or expensive formation processes. Additionally, these types of devices, when being fabricated, typically utilize one or more active and labor-intensive alignment processes, wherein the particular components are individually aligned and evaluated by use of multiple alignment tests as part of an assembly process, before use in a device, such as a communication device, for example. Alignment of the components of an interconnect device such as an optical interconnect device is typically challenging, due at least in part to the precision typically desirable for an optical device, and the risk of associated signal losses if components are not aligned, which consequently may impact data transfer capabilities, for example.

Figure 1:
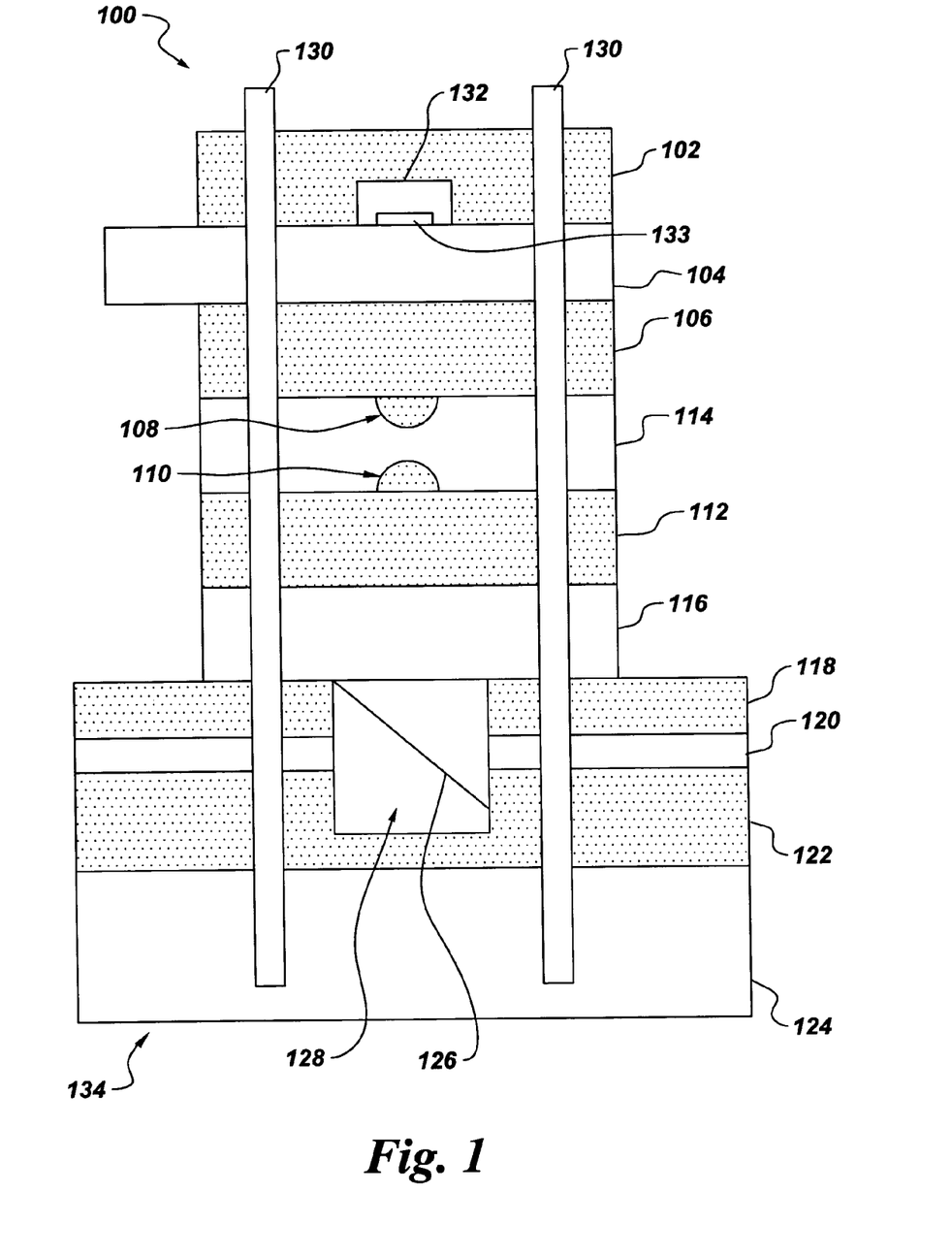
FIG. 1 is a schematic cross sectional view of an optoelectronic package, in accordance with at least one embodiment.

In one embodiment of the claimed subject matter, an interconnect device may comprise one or more lens devices and/or one or more mirrors, wherein the one or more lens devices and/or mirrors are aligned, at least in part, by use of one or more spacers and/or one or more pins. Referring now to FIG. 1, there is illustrated an optoelectronic device, which may comprise an optical interconnect device, in accordance with at least one embodiment. Illustrated in FIG. 1 is an optoelectronic package 100. Optoelectronic package 100, in this embodiment, comprises an optical component layer 102, which may comprise a VCSEL device and/or a photo-detector device, although it is desirable to note that embodiments of the claimed subject matter are not so limited. For example, other active devices or a combination of one or more devices, including a VCSEL array or photo-diode array and/or an array comprising a combination of VCSEL devices and photo-diodes, for example, may be used in at least one embodiment. Additionally, optical component layer 102, in this embodiment, comprises an active region 132, which may comprise one or more light generating and/or detecting components (shown as electromagnetic element 133, for example), such as an array of light generating devices such as light emitting diodes or photodiodes, for example. Optical component layer 102 is coupled to an electrical interconnect layer 104, which may be capable of sending and/or receiving electrical signals from one or more other devices (not shown), such as one or more devices coupled to substrate 134, explained in more detail later, and which is sufficiently transparent (either due to the properties of the material comprising the interconnect layer or due to an opening (not shown) in the interconnect layer) to permit light to pass between the active region and the substrate. Lens layer 106, in this embodiment, may comprise a lens device comprising one or more lenses, such as an array of lenses (not shown), including lens array 108, and may comprise one or more fresnel lenses, although the claimed subject matter is not so limited, as will be explained in more detail later. These lenses and optical elements can all be anti-reflection-coated to reduce the back-reflection and eliminate the associated optical crosstalks. In one embodiment, the array of lenses may comprise an array of 1×12 lenses, as just an example. Spacers 114 may provide particular spacing between lens array 108 and lens array 110, for example, such as adequate spacing such that lens arrays 108 and 110 are not in physical contact, such that the surfaces of the lenses are not damaged, as just an example. Lens array 110 may be embodied on a lens layer 112, for example, which may comprise one or more additional lenses (not shown), for example, and the one or more additional lenses may comprise an array of lenses, such as the aforementioned 1×12 lens array, for example, and may be the same number of lenses as formed on lens layer 106, for example; however, in alternative embodiments, this may not be the case. For example, the arrays may have different numbers of lenses in an alternative embodiment.

A mirror layer 116 may be coupled to the lens layer 112, for example. Mirror layer 116 may comprise a reflective surface, such as mirror surface 126, and may have a particular configuration, such as a mirror surface with an approximately 45 degree angle from the surface of substrate 134, for example, although the claimed subject matter is not limited in this respect, and the mirror surface may comprise any configuration resulting in at least partial reflection of optical signals between one or more lenses and one or more waveguides, for example. In one embodiment, mirror surface 126 may comprise a dielectric mirror, comprising a reflective coating formed on the surface of mirror layer 116, for example, or may comprise a TIR (total internal reflection) mirror, although it is desirable to note that the claimed subject matter is not so limited, and mirror surface 126 may have numerous shapes and/or configurations, and may be formed by use of varying processes, for example, and the claimed subject matter is not limited to a particular shape, configuration or process. As illustrated in FIG. 1, mirror surface 126 may be disposed at least partially within a cavity 128. Cavity 128 may have particular dimensions, and the particular dimensions may depend at least in part upon one or more other factors such as the configuration of mirror surface 126, for example. Coupled to mirror layer 116 is a substrate 134. Substrate 134 may provide optical and/or mechanical coupling and supporting for one or more aforementioned components, such as when secured with pins 130, for example, and may comprise one or more waveguide layers, such as waveguide layer 120, for example. In this embodiment, substrate 134 comprises a waveguide lamination layer 118, which may be coupled to mirror layer 116, such as in direct physical contact, for example. Substrate 134 may further comprise a waveguide layer 120, which may comprise optical data transport media, for example, and may comprise a layer of media wherein the media is capable of at least partially transmitting light, for example. Substrate 134 may further comprise a second waveguide lamination layer 122, and support layer 124, for example. Lamination layers 118 and 122 may comprise layers of a laminated circuit board, for example, and substrate layer may comprise a base layer of such a circuit board. Pins 130 may at least partially pass through one or more of the aforementioned components, and may provide functions such as securing and/or alignment functions, for example. Pins 130 may comprise one or more types of pins, such as MT pins, for example, and will be explained in more detail later.

In operation, a device such as device 100 may perform the following functions, although this is for illustrative purposes only, and the claimed subject matter is not so limited. Electrical signals may be received by electrical interconnect layer 104. In one embodiment, data in the form of electrical signals may be provided by one or more components of a circuit board or other electrical signal source (not shown). As part of the data transfer process, one or more electrical signals may be provided to optical component layer 102, which may comprise a VCSEL device, for example, and optical component layer 102 may cause active region 132 to generate one or more optical signals, such as one or more laser beam pulses, in response to the electrical signals. Although explained hereinafter in reference to beam pulses, it is important to note that optical signals are not limited to beam pulses, in alternative embodiments. For example, depending on the optical source, a device may generate optical signals of electromagnetic radiation that are not laser beam pulses, but may comprise electromagnetic radiation having a wavelength not within the laser range of the spectrum. The optical signals may be provided to lens layer 106, and one or more lenses of lens array 108 may collimate the one or more beam pulses, and the collimated beam pulses may be provided to lens array 110 and lens layer 112. One or more of these lens layers may be used to provide for collimating of the divergent light beam from a VCSEL or for focusing a collimated light beam onto a photo-diode, as just an example. One or more lenses of lens array 110 may focus or narrow one or more of the collimated beam pulses, and may provide the one or more collimated and focused beam pulses to mirror layer 116, and subsequently mirror surface 126. Mirror surface 126, depending at least in part on shape and/or configuration, may reflect at least a portion of the beam pulses to waveguide layer 120. Waveguide layer 120 may provide transport of the beam pulses to one or more additional optical devices (not shown). The beam pulses may subsequently be provided to one or more optical detectors, may be converted to one or more electrical signals, and may be provided to one or more other components of the circuit board or other substrate, for example.

Figure 2:
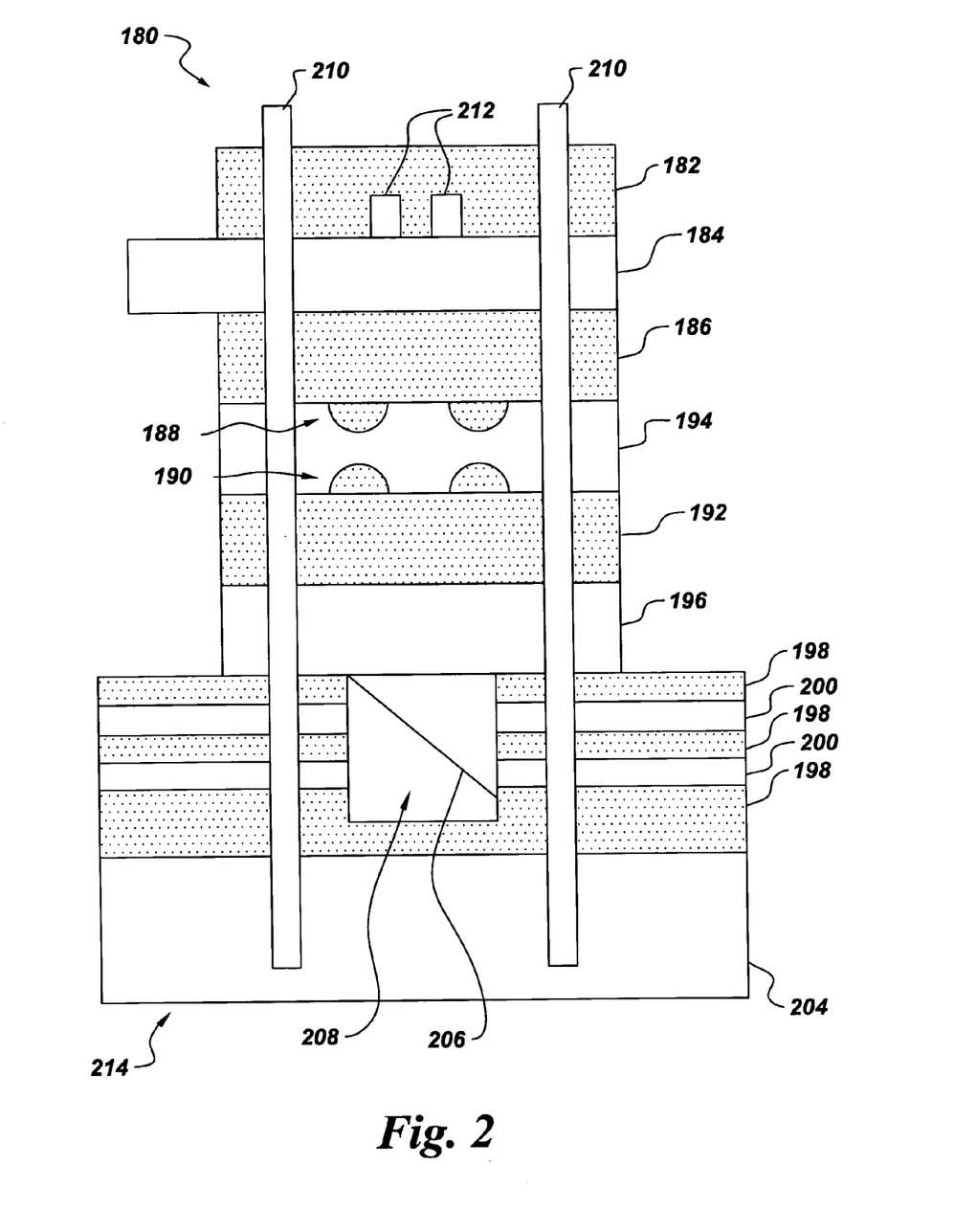
FIG. 2 is a schematic cross sectional view of an optoelectronic package, in accordance with at least another embodiment.

Additionally, illustrated in FIG. 2 is another embodiment of an optoelectronic device, in accordance with another embodiment of the claimed subject matter. Illustrated in FIG. 2 is optoelectronic device 180, comprising an optical component layer 182, which may comprise one or more VCSEL or a photo-diode devices, such as an array of one or more of these devices, for example. Optical component layer 182 may comprise a plurality of active regions 212, which may comprise one or more light emitting and/or detecting components. In one particular configuration, at least one active region 212 comprises a VCSEL device, and at least one active region 212 comprises a photo-diode, as just an example. An electrical interconnect layer 184 may be coupled to the optical component layer 182 and/or the active regions 212, for example. A lens layer 186, which may comprise a plurality of lenses 188, may be coupled to electrical interconnect layer 184. An additional lens layer 192, which may comprise a plurality of lenses 190, may be formed proximate to lens layer 186, separated by spacers 194, for example. Although not limited in this respect, in one embodiment, lens layers 186 and/or 192 may each comprise a 2×12 array of lenses, for example. One or more of these lenses may be used to at least approximately match the numerical aperture of the waveguide layer 200, for example. Mirror layer 196, which may comprise a mirror surface 206, may be coupled to lens layer 192, such as for example. Mirror surface 206, in this embodiment, may have a particular shape and/or configuration, such as a TIR mirror configured approximately 45 degrees from the top surface of substrate (shown as waveguide device 214), for example, and may be disposed at least partially within cavity 208, for example. However, it is important to note that the claimed subject matter is not limited to any particular angle of configuration for the mirror surface, and the mirror surface 206 may comprise any configuration resulting in at least partial reflection of optical signals between one or more lenses and one or more waveguides, for example. Pins 210, which may comprise MT pins, may be inserted at least partially through one or more of the aforementioned components, and may provide functions such as securing and/or passive alignment functions, for example. Additional adhesives can be used secure the entire assembly when necessary.

Coupled to the mirror layer 196 is a waveguide device 214. Waveguide device 214 comprises multiple waveguide lamination layers 198, substrate layer 204, and multiple waveguide layers 200. In operation, a device such as device 180 may perform the following functions, although this is for illustrative purposes only, and the claimed subject matter is not so limited. Electrical signals may be received by electrical interconnect layer 184. One or more electrical signals may be provided to optical component layer 182, which may comprise one or more VCSEL devices or photodiodes, for example. In a specific light emitting embodiment, optical component layer 182 may generate one or more optical signals, such as one or more beam pulses by use of a laser diode (not shown). The optical signal in the form of a beam may be provided to lens layer 186, and may pass through electrical interconnect layer 184, for example. In this embodiment, optical signals provided by interconnects in interconnect layer 184 may be capable of being generated by multiple signal sources of the VCSEL, and the multiple signal paths of the interconnect device, for example. Lenses 188 may receive respective signals from optical component layer 182, and may collimate the respective signals, for example. The respective signals may be provided respectively to lenses 190, which may be configured to focus and/or narrow the collimated beams, for example. One or more of these lenses may be used to at least approximately match the numerical aperture of the waveguide layer 200, for example. Mirror surface 206 may be configured such that said multiple beam pulses are reflected respectively to waveguide layers 200. Waveguide layers 200 may provide transmission of the beam pulses to one or more additional optical devices (not shown). As can been seen from this particular embodiment, this optoelectronic assembly may comprise a greater number of components than device 100, such as a plurality of lenses in a lens layer. This may result in a device that is capable of operating in a multi-channel manner, as alluded to previously.

Figure 3:
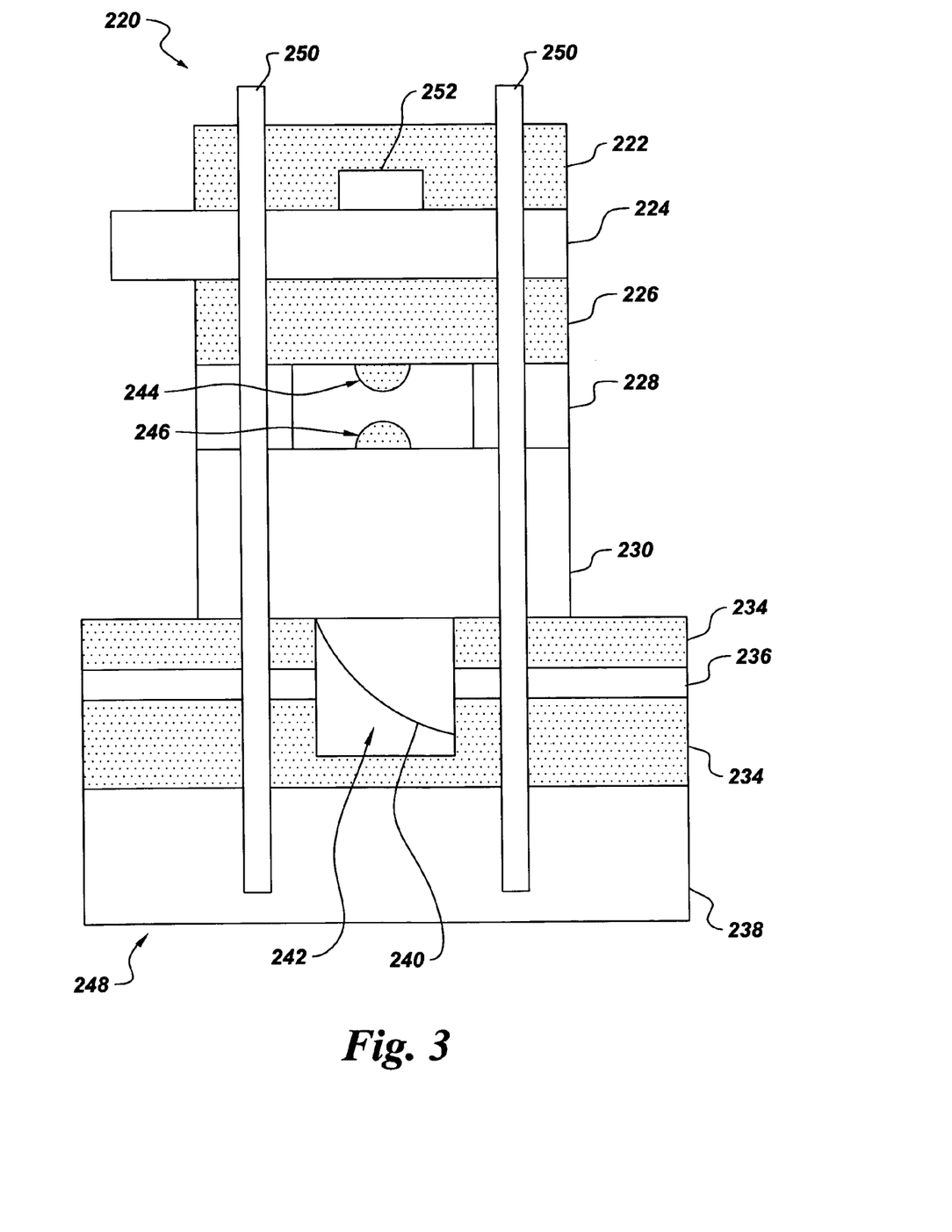
FIG. 3 is a schematic cross sectional view of an optoelectronic package, in accordance with at least yet another embodiment.

Additionally, illustrated in FIG. 3 is yet another embodiment of an optoelectronic device, in accordance with another embodiment of the claimed subject matter. Illustrated in FIG. 3 is optoelectronic device 220, comprising an optical component layer 222, which may comprise one or more VCSEL or photodiode devices, and/or an array of one or more of these devices, and an active region 252. An electrical interconnect layer 224 may be coupled to the optical component layer 222, for example. A lens layer 226, which may comprise a plurality of lenses such as lenses 244, may be coupled to electrical interconnect layer 224. A lens layer 230, which may monolithically comprise a plurality of lenses such as lenses 246, and may additionally comprise mirror surface 240, may be formed proximate to lens layer 226, and may be separated by spacers 228, for example. In this embodiment, lens layer 230 comprises a mirror surface and one or more lenses monolithically integrated into a single component, which may, for example, reduce the number of components of an optoelectronic device and/or reduce the number of processes utilized to manufacture an optoelectronic device in accordance with one or more other embodiments, explained in more detail later. Although not limited in this respect, in one embodiment, lens layer 226 and/or lens layer 230 may comprise a 1×12 array of lenses, for example. Lens layer 230 may additionally comprise a mirror surface 240, and mirror surface 240 may have a particular shape and/or configuration, such as a TIR mirror configured approximately 45 degrees from the top surface of substrate 248, for example, and may be disposed at least partially within cavity 242, for example. However, it is important to note that the claimed subject matter is not limited to any particular angle of configuration for the mirror surface, and the mirror surface 240 may comprise any configuration resulting in at least partial reflection of optical signals between one or more lenses and one or more waveguides, for example. Pins 250, which may comprise MT pins, may be inserted at least partially through one or more of the aforementioned components, and may provide functions such as securing and/or alignment functions, for example.

Coupled to the lens layer 230 is a substrate 248. Substrate 248 may comprise multiple waveguide lamination layers 234, base layer 238, and waveguide layer 236, in this embodiment, although it is desirable to note that the claimed subject matter is not limited in this respect. In operation, a device such as device 220 may perform the following functions, although this is for illustrative purposes only, and the claimed subject matter is not so limited. Electrical signals may be received by electrical interconnect layer 224. One or more electrical signals may be provided to optical component layer 222, and optical component layer 222 may generate one or more optical signals, such as one or more beam pulses by active region 252, which may comprise one or more laser diodes (not shown), for example, and the signals may be provided based at least in part on one or more electrical signals provided by electrical interconnect layer 224, for example. The one or more optical signals may be provided to lens layer 226, and may pass through electrical interconnect layer 224, for example, either due to the properties of the material comprising the interconnect layer or due to an opening (not shown) in the interconnect layer. Lens array 244 may receive optical signals from active region 252, and may collimate the signals, for example. The optical signals may be provided to lens array 246, which may be configured to focus and/or narrow the collimated signals, for example. Mirror surface 240 may be configured such that the signals may be reflected towards waveguide layer 236. Waveguide layer 236 may provide transmission of the signals to one or more additional optical devices (not shown).

FIG. 3 additionally illustrates an embodiment wherein a reflective device (shown as mirror 242) is shaped to facilitate coupling of light to waveguide layer 236. In this embodiment, lenses 244 and 246 are useful but not required. In the specific aspect shown in FIG. 3, mirror 242 has a curved shape.

Figure 4:
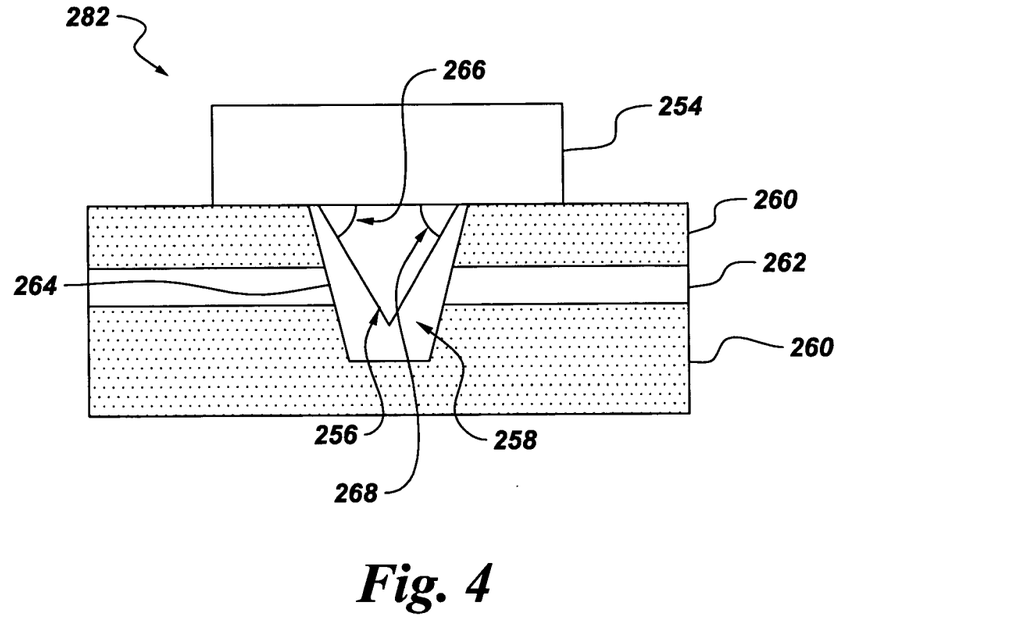
FIG. 4 is one schematic cross sectional views of a portion of an optoelectronic package, in accordance with at least one embodiment.
Figure 5:
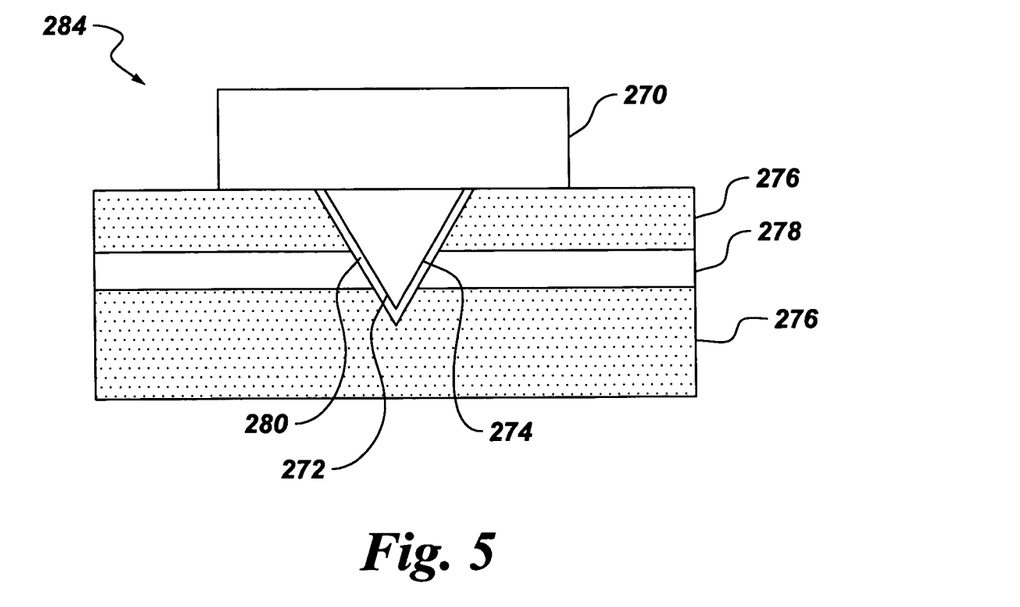
FIG. 5 is another schematic cross sectional views of a portion of an optoelectronic package, in accordance with at least one embodiment.

Illustrated in FIGS. 4 and 5 are two embodiments 282 and 284 of a portion of an optoelectronic device, such as a portion of one or more of the devices illustrated in FIGS. 1, 2 and 3. Illustrated in FIGS. 4 and 5 are optoelectronic package portions 282 and 284. Illustrated as part of portion 282 is a mirror layer 254 with a mirror surface 256, and an output surface 258. Mirror layer 254 may comprise a TIR mirror, for example, although this is not a requirement.

Mirror surface 256 is shown configured at a particular angle 266 from horizontal, and output surface 258 is shown configured at a particular angle 268 from horizontal. Mirror surface 256 and output surface 258 may be disposed at least partially within cavity 264, for example. Coupled to the mirror layer 254 is a waveguide device, comprising multiple waveguide lamination layers 260, and waveguide layer 262, for example. As shown in portion 282, cavity 264 may have a particular shape and/or configuration, and may be configured to allow the mirror surfaces to be disposed at least partially within the cavity 264, but may comprise a shape that provides particular fabrication advantages, such as by not comprising a rectangular shape, but may comprise a cavity with tapered or inclined walls, for example. In one particular embodiment, angle 266 may comprise an approximately 45 degree angle, and angle 268 may comprise an angle less than a 90 degree angle. In this particular configuration, by providing an output surface with an angle less than 90 degrees, one or more optical effects including back reflection and/or optical cross-talk may be reduced, as compared to an output surface configured with a 90 degree angle, such as by offsetting the angle of the mirror surface 256, as just an example. Alternatively, mirror layer 254 may monolithically comprise a plurality of lenses, for example, such as at least partially illustrated in FIG. 3.

Similarly, illustrated as part of portion 284 is a mirror layer 270 with a mirror surface 272, and an output surface 274. Mirror layer 270 may comprise a TIR mirror, for example, although this is not a requirement. Coupled to the mirror layer 270 is a waveguide device, comprising multiple waveguide lamination layers 276, and waveguide layer 278, for example. Mirror surface 272 and output surface 274 may be configured at particular angles, such as mirror surface being configured approximately 45 degrees from horizontal and output surface being configured approximately less than 90 degrees from horizontal, such as described in reference to portion 282, for example. As shown in this embodiment, mirror surface 272 and output surface 274 may be disposed at least partially within cavity 280, and cavity 280 may be configured to be substantially the same configuration as the surfaces, for example, such that the mirror surfaces, when assembled into the portion 284 are adjacent to the respective walls of the cavity, for example. This may provide particular advantages, such as one or more self alignment functions, for example, due to the configuration of the cavity and the mirror surfaces, and may aid other alignment devices, such as one or more pins, when assembled into a complete device, for example. This may, for example, reduce or eliminate the need to perform optical aligning functions, such as when portion 284 is assembled into an optoelectronic package, as just an example. Additionally, as explained in reference to portion 282, one or more optical effects including back reflection may be reduced by providing an output surface with an angle less than 90 degrees, as compared to an output surface configured with a 90 degree angle, such as by offsetting the angle of the mirror surface 272, as just an example. Alternatively, mirror layer 270 may monolithically comprise a plurality of lenses, for example, such as at least partially illustrated in FIG. 3.

Figure 6:
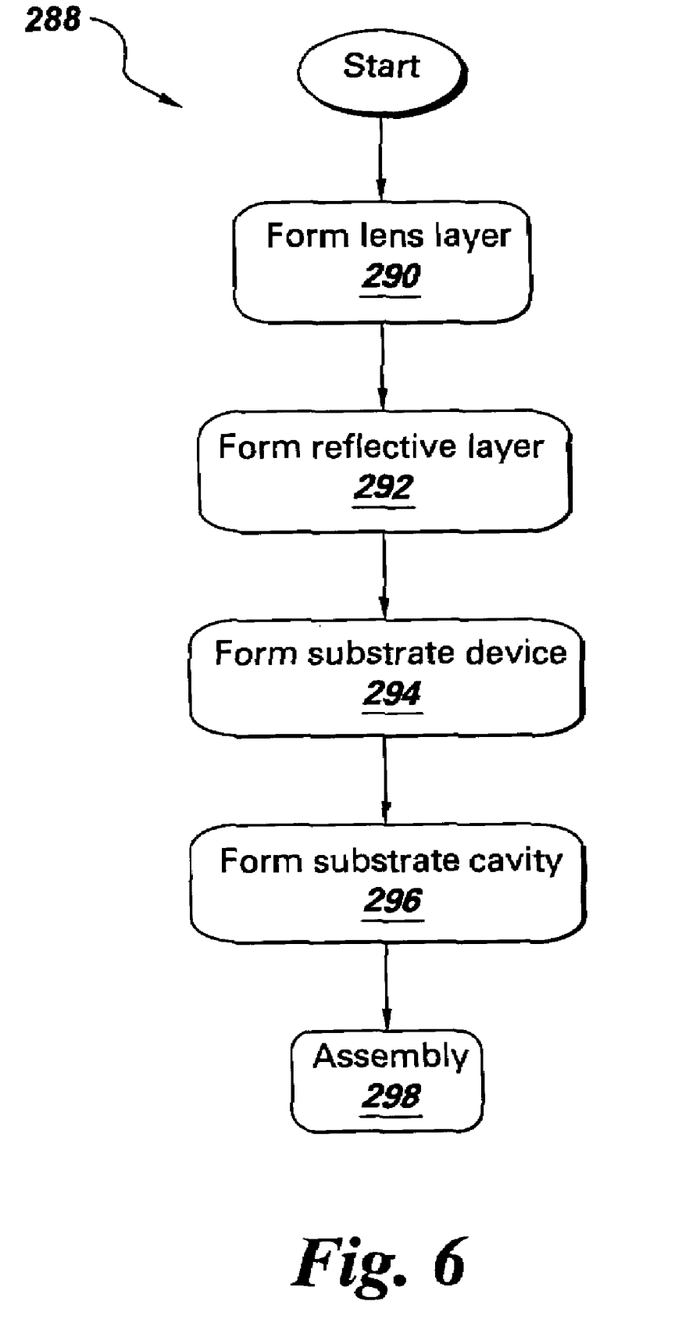
FIG. 6 is a block diagram illustrating a method of forming an optoelectronic package, in accordance with at least one embodiment.

Fabrication of devices, such as the devices illustrated in FIGS. 1, 2, 3, 4 and/or 5 may comprise multiple process operations, and the claimed subject matter is not limited in the manner, and or number or type of process operations that may be utilized to form one or more of the aforementioned devices. In one particular embodiment, a method of making one or more of the aforementioned embodiments is illustrated in FIG. 6. FIG. 6 illustrates a flowchart 288, with numerous blocks. However, the claimed subject matter is not so limited, the order in which the particular operations are presented does not necessarily imply a particular order of operation, and the claimed subject matter may comprise one or more methods comprising one or more of the following operations, and may comprise additional intervening, substitute, or subsequent operations. At a high level, one or more lens layers may be formed at block 290. At block 292, one or more reflective layers may be formed. A substrate device, which may comprise one or more waveguides, may be formed at block 294, a substrate cavity may be formed at block 296, and one or more of the formed components may be at least partially assembled at block 298.

More specifically, in this embodiment, at block 290, one or more lens layers may be formed. A lens layer, in this embodiment, may comprise a one or more lenses, such as optical lens arrays, and may be formed from one or more materials. The one or more lens layers may be formed by molding, such as micromolding, or may be formed by one or more etching or machining including diamond-turning processes, for example. Formation of the lens layer may depend at least in part on the type of material or combination of materials utilized to form the one or more lens layers, and may additionally depend at least in part on the size or features of the one or more lens layers, for example. In at least one embodiment, a lens layer may be formed from glass, ceramic, polymer, plastic, or a combination thereof, for example. Multiple lenses may be formed as part of the lens layer, if, for example multiple lenses are to be utilized, for example, in a resultant optoelectronic device, if such a device is being formed, for example. A device such as device 100 of FIG. 1, for example, may comprise two lens layers, and the lens layers may differ, such as one lens layer being configured to collimate light, and one lens layer being configured to focus light, as just an example, and the lens layers may comprise an array of lenses, such as the aforementioned 1×12 or 2×12 array of lenses, for example. Therefore, differing layers may utilize differing criteria for formation, depending on a variety of factors too numerous to mention specifically; although, such considerations are generally within the level of one of ordinary skill.

In this embodiment, at block 292, formation of a reflective layer may comprise forming a material layer that may comprise at least one mirror. The reflective layer may be formed from materials, such as plastic, glass, ceramic, metal, and/or polymer, for example, and may be formed by use of one or more processes such as molding, etching, deposition, and/machining, for example, and selection of a process for formation may depend at least in part on the type of material or combination of materials utilized to form the reflective layer and/or one or more features thereon. In at least one embodiment, a reflective layer may be formed from one or more polymer materials, and may be formed to have a mirror surface such as a metallic mirror, a TIR mirror and/or dielectric mirror, for example. In this embodiment, a dielectric mirror may comprise a surface, such as a polymer surface, with a layer of reflective material, such as dielectric material and/or metal material formed thereon. In at least one embodiment, the reflective layer may be formed such that the mirror surface has a particular configuration, such as an approximately 45 degree angle from the bottom surface of the reflective layer, for example. Additionally, the output surface of the mirror may be formed to have a particular configuration, such as an approximately 90 degree angle from the bottom surface of the reflective layer, but, in alternative embodiments, the angle may comprise an angle more or less than 90 degrees, and this may have particular fabrication and/or optical advantages, as explained previously. As will be explained in more detail later, the bottom surface of the reflective layer may, when assembled in an optoelectronic package, for example, contact the top surface of a substrate, and may be secured to the substrate by use of one or more pins. Alternatively, a reflective layer may be formed with at least one mirror and at least one lens, such as lens layer 230 of FIG. 3. In this embodiment, the lens layer may be formed by use of one or more of the aforementioned processes, and may be formed by use of one or more of the aforementioned materials, for example.

In this embodiment, at block 294, a substrate device may be formed. The substrate device may be formed by use of one or more formation processes, such as one or more lithography, etching and/or deposition processes. In one embodiment, an adaptive lithography process employed as part of high density interconnect (HDI) or chip-on-flex (COF) fabrication may be utilized to at least partially form the substrate device, although, this is merely an example and the claimed subject matter is not limited in scope to this example. In one embodiment, the substrate device may comprise one or more substrate layers, one or more lamination layers, and one or more waveguides. Selection of materials and/or methods for formation may depend at least in part on factors such as the number and/or types of layers, the desired properties of one or more components of the substrate, such as the waveguides, including as the desired optical signal transfer capabilities of the waveguides, as well as one or more characteristics of one or more other components of the resultant optoelectronic device to be formed, in this particular example. It is desirable to note, however, that methods of formation of a waveguide device may vary, and the claimed subject matter is not limited to any particular method or methods of formation. In one particular embodiment, one or more HDI or COF fabrication processes may be utilized. HDI, in this context, comprises a high density multichip module manufacturing processes, which includes one or more adaptive lithography processes wherein a substrate of a particular material, such as a ceramic substrate, may be formed with one or more cavities suitable to receive one or more components. HDI fabrication processes have been developed by General Electric Company, and numerous methods of fabrication in accordance with one or more embodiments of HDI are disclosed in the following: U.S. Pat. No. 4,835,704, entitled "Adaptive Lithography System to Provide High Density Interconnect", by Eichelberger et al., issued May 30, 1989, and assigned to General Electric Company; U.S. Pat. No. 5,737,458 and U.S. Pat. No. 5,525,190, both entitled "Optical Light Pipe and Microwave Waveguide Interconnects in Multichip Modules Formed Using Adaptive Lithography", by Wojnarowski et al., issued Apr. 7, 1998 and Jun. 11, 1996 respectively, and commonly assigned; U.S. Pat. No. 5,357,403, entitled "Adaptive Lithography in a High Density Interconnect Structure Whose Signal Layers Have Fixed Patterns", by Haller et al., issued Oct. 18, 1994, and assigned to General Electric Company; and U.S. Pat. No. 5,449,427, entitled "Processing Low Dielectric Constant Materials for High Speed Electronics", by Wojnarowski et al., issued Sep. 12, 1995, and assigned to General Electric Company.

Continuing with this embodiment, after placement of one or more components, which may comprise electrical components, the substrate may be coated with a film, such as a Kapton® polyimide, such as available from E. I du Pont de Nemours & Company, to a particular thickness, which may comprise a substantially uniform thickness, for example. At least a portion of the substrate with a Kapton Polyimide may be coated with another material, such as an Ultem® polyetherimide resin, available from General Electric Company, for example. One or more via holes may be drilled into the substrate, such as to provide interconnections for the components placed on the substrate, for example. The via may be metallized, for example, and the substrate may be patterned with one or more metal traces, for example, such as by use of one or more photolithography techniques, for example. Additionally, one or more waveguides, such as waveguides illustrated in FIGS. 1, 2, 3, 4 and/or 5, may be formed by use of one or more HDI fabrication processes. In one particular technique, a device formed by use of the above described process may be formed. A portion of the substrate may be removed, such as by milling away selected portions of the substrate by use of laser milling and/or laser ablating, for example. Selected portions of the substrate may be removed to form one or more cavities, and/or one or more channels, for example. In this embodiment, waveguide material may be deposited in the one or more channels, resulting in the formation of one or more integrated waveguides in a substrate. Conversely, rather than forming channels in the substrate, a layer of waveguide material may be formed on a substrate, and the waveguide material may be selectively removed, such as by milling, resulting in the formation of one or more patterned waveguides, for example.

In this embodiment, at block 296, a substrate cavity may be formed. The cavity may be formed in a portion of the waveguide device formed as part of block 294, for example, and may be formed by use of one or more HDI or regular printed circuit board fabrication processes, for example. In one embodiment, a waveguide cavity may be formed by use of one or more laser ablating, etching, and/or mechanical processes, such as cutting and/or drilling, for example, but particular methods of formation of a cavity may depend at least in part on the type of material or combination of materials used to form the waveguide device, and/or the dimensions of the cavity, for example. In at least one embodiment, a cavity may be formed such that at least a portion of a reflective layer, such as a mirror surface formed at block 292 may fit within the cavity. In this embodiment, the cavity and reflective layer may be formed such that the resulting configuration of the mirror surface has an approximately 45 degree angle from the top surface of the substrate, as just an example. It is desirable to note that this is not a requirement, however, and, in at least one embodiment, the mirror surface is configured such that the mirror is capable of reflecting at least a portion of the optical signals provided by an optical signal source such as a VCSEL, such that at least a portion of the optical signals may be provided to one or more waveguides, for example. Additionally, the output surface of the mirror may be formed to have a particular configuration, such as an approximately 90 degree angle from the bottom surface of the reflective layer, but, in alternative embodiments, the angle may comprise an angle more or less than 90 degrees, and this may have particular fabrication and/or optical advantages, as explained previously.

In this embodiment, at block 298, assembly of the device may comprise assembling one or more of the components formed by use of the aforementioned processes, or other processes currently known or to be later developed. When assembled, in at least one embodiment, a device to be manufactured may comprise an optoelectronic device, and may be similar to one or more of the aforementioned embodiments, such as those illustrated in FIGS. 1, 2, 3, 4 and/or 5, for example. However, these are merely examples and the claimed subject matter is not limited in scope to these examples. In at least one embodiment, one or more pins may be inserted at least partially through one or more of the aforementioned layers, and may be used to secure and/or align one or more components, such as illustrated in one or more of the aforementioned figures. For example, as part of one or more of the aforementioned processes, such as one or more adaptive lithography processes, an additional formation operation may comprise formation of one or more pin holes, wherein one or more pin holes may be formed in order to allow one or more pins to secure and/or align one or more of the aforementioned components. In at least one embodiment, one or more pins may comprise one or more industry standard pins such as MT pins, as just an example.

In at least one embodiment, an electrical interconnect layer and/or an optical component layer, which may include one or more VCSEL and or photo-diode devices, for example, may be formed on the resultant device by applying one or more of the operations discussed in conjunction with FIG. 6. In at least one embodiment, an electrical interconnect layer may be formed on one surface of one or more lens layers, and a VCSEL may be formed on one surface of an electrical interconnect layer, for example. In at least one embodiment, a device similar to one or more of the devices illustrated in FIGS. 1-4 may be formed. In at least one embodiment, a device comprising an optoelectronic device may be formed, wherein formation and/or assembly necessitates no additional aligning operation, and the components are thereby passively aligned, such as by use of one or more pins inserted at least partially through one or more components to be aligned, for example, and, alternatively, by use of a cavity configuration and a mirror surface configuration, as explained in reference to FIGS. 4 and 5 In this context, passively aligned refers generally to alignment of one or more components wherein additional aligning and/or adjusting of components is not required after assembly in order to produce an aligned device, for example.

It will, of course, also be understood that, although particular embodiments have just been described, the claimed subject matter is not limited in scope to a particular embodiment or implementation. For example, one embodiment may be in hardware, such as implemented to operate on a device or combination of devices, as previously described, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. An apparatus, comprising:
a substrate, said substrate having a top surface;
at least one optical data transport medium coupled to the substrate;
one or more lens devices disposed on a lens layer coupled to the substrate; and
one or more reflective devices coupled to the substrate, wherein said one or more lens devices and said one or more reflective devices are at least partially passively aligned with said at least one optical transport medium by use of one or more pins that pass through at least the lens layer.

2. The apparatus of claim 1, wherein said one or more lens devices and said one or more reflective devices further comprise an optical interconnect device.

3. The apparatus of claim 1, wherein said substrate comprises a circuit board.

4. The apparatus of claim 3, wherein said circuit board at least partially comprises a polyetherimide resin.

5. The apparatus of claim 1, wherein said lens device comprises one or more arrays of optical lenses.

6. The apparatus of claim 5, wherein at least one of said arrays of lenses comprises a single array of 12 lenses.

7. The apparatus of claim 5, wherein at least one of said optical lenses comprises a fresnel lens.

8. The apparatus of claim 1, wherein said one or more reflective devices comprises a mirror surface and an output surface.

9. The apparatus of claim 8, wherein said mirror surface further comprises at least one of: a metallic mirror, a total internal reflection mirror or a dielectric mirror.

10. The apparatus of claim 9, wherein said mirror surface is configured at an approximately 45 degree angle from the top surface of said substrate.

11. The apparatus of claim 9, wherein said output surface is configured at an angle less than approximately 90 degrees from the top surface of said substrate.

12. The apparatus of claim 1, wherein at least one of said optical data transport mediums comprises a waveguide, wherein said waveguide is at least partially integrated into said substrate.

13. The apparatus of claim 1, and further comprising a VCSEL (vertical cavity service emitting laser) coupled to the substrate.

14. The apparatus of claim 1, and further comprising one or more photodiodes coupled to the substrate.

15. The apparatus of claim 1 wherein said one or more reflective devices comprises at least one reflective device shaped to facilitate coupling to said at least one optical transport medium.

16. A method, comprising:
forming at least one reflective device;
forming at least one lens on a lens layer;

forming at least one substrate;
forming at least one cavity and at least one optical data transport medium in the substrate; and
coupling said at least one reflective device and said at least one lens to said substrate, wherein said reflective device is at least partially passively aligned to said optical data transport medium by use of one or more pins that pass through at least the lens layer.

17. The method of claim 16, wherein said reflective device is at least partially passively aligned by use of said cavity.

18. The method of claim 16, and further comprising coupling one or more spacers to at least one of said at least one lens.

19. The method of claim 16, wherein said at least one lens, at least one reflective device, and at least one substrate, when coupled comprise an optical via.

20. The method of claim 16, wherein said forming at least one lens further comprises forming at least one optical device by use of one or more of: etching, molding, and/or machining.

21. The method of claim 16, wherein said forming at least one reflective devices comprises forming at least one mirror device by use of one or more of: etching, molding, and/or machining.

22. The method of claim 16, wherein said substrate further comprises multiple layers, and one or more substrate layers are formed by use of one or more of: lithography, etching and/or deposition processes.

23. The method of claim 21, wherein said one or more substrate layers are substantially formed by use of a high density interconnect (HDI) fabrication process.

24. The method of claim 16, wherein said at least one cavity is substantially formed by use of one or more of: laser ablating, etching, cutting and/or drilling.

25. The method of claim 16, wherein said coupling further comprises inserting at least one of said one or more pins at least partially through at least one of said at least one lenses, said at least one reflective devices, and said at least one substrate.

26. A system, comprising:
an electromagnetic radiation interconnection device;
an electromagnetic element; and
an optical data transport medium, said electromagnetic radiation interconnection device, said electromagnetic element, and said optical data transport medium being coupled by use of one or more pins that pass through at least the optical data transport medium.

27. The system of claim 26, wherein said electromagnetic element comprises at least one or an array of: VCSEL (vertical cavity surface emitting laser), laser diode, light-emitting diode (LED), photodiode, PIN diode, avalanche photodiode.

28. The system of claim 26, wherein said electromagnetic radiation interconnection device further comprises an optical via.

29. The system of claim 26, wherein said optical data transport medium further comprises at least one waveguide.

30. The system of claim 26, wherein said electromagnetic radiation interconnection device further comprises:
a substrate, said substrate having a top surface;
at least one optical data transport medium coupled to the substrate;
one or more lens devices coupled to the substrate;
one or more reflective devices coupled to the substrate, wherein said one or more lens devices and one or more reflective devices are at least partially passively aligned with said at least one optical data transport medium.

31. The system of claim 30, wherein said one or more lens devices and one or more reflective devices are at least partially passively aligned by use of one or more pins.

32. The system of claim 30, wherein said substrate comprises a circuit board.

33. The system of claim 30, wherein said circuit board at least partially comprises a polyetherimide resin.

34. The system of claim 30, wherein said lens device comprises one or more arrays of optical lenses.

35. The system of claim 34, wherein at least one of said arrays of lenses comprises a single array of 12 lenses.

36. The system of claim 30, wherein said one or more reflective devices comprises a mirror surface and an output surface.

37. The system of claim 36, wherein said mirror surface further comprises at least one of: a total internal reflection mirror or a dielectric mirror.

38. The system of claim 36, wherein said mirror surface is configured at an approximately 45 degree angle from the top surface of said substrate.

39. The system of claim 36, wherein said output surface is configured at an angle equal or less than approximately 90 degrees from the top surface of said substrate.

40. The system of claim 36, wherein said output surface is configured at an angle matching or different from the output surface of cavity.

41. An apparatus, comprising:
an optical component layer including at least one electromagnetic element;
a substrate, said substrate having a top surface;
at least one optical data transport medium coupled to the substrate; and
one or more reflective devices coupled to the substrate, wherein said one or more reflective devices are at least partially passively aligned with said at least one optical transport medium and said at least one electromagnetic element by use of one or more pins that pass through at least the optical data transport medium.

42. The apparatus of claim 41 wherein said one or more reflective devices comprises at least one reflective device shaped to facilitate coupling to said at least one optical transport medium.

43. The apparatus of claim 42, wherein said at least one electromagnetic element comprises an element selected from the group consisting of at least one VCSEL (vertical cavity surface emitting laser), at least one photodiode, and combinations thereof.

44. The apparatus of claim 42, wherein said substrate comprises a circuit board, said circuit board at least partially comprising a polyetherimide resin.

45. The apparatus of claim 42, wherein at least one of said optical data transport mediums comprises a waveguide, wherein said waveguide is at least partially integrated into said substrate.

46. The apparatus of claim 42, wherein the at least one reflective device comprises a curved shape.

* * * * *